United States Patent [19]

Hasenauer et al.

[11] Patent Number: 4,656,102
[45] Date of Patent: Apr. 7, 1987

[54] ELECTROCHEMICAL STORAGE CELL

[75] Inventors: Dieter Hasenauer, Weinheim; Franz Lenz, Neulussheim, both of Fed. Rep. of Germany

[73] Assignee: Brown, Boveri & Cie AG, Mannheim-Käfertal, Fed. Rep. of Germany

[21] Appl. No.: 805,281

[22] Filed: Dec. 4, 1985

[30] Foreign Application Priority Data

Dec. 8, 1984 [DE] Fed. Rep. of Germany ......... 3444917

[51] Int. Cl.$^4$ .......................................... H01M 10/39
[52] U.S. Cl. ................................................. 429/104
[58] Field of Search ..................................... 429/104

[56] References Cited

U.S. PATENT DOCUMENTS

| | | | |
|---|---|---|---|
| 4,206,272 | 6/1980 | Fischer et al. | 429/104 |
| 4,246,325 | 1/1981 | Hatch | 429/104 |
| 4,247,605 | 1/1981 | Paquette | 429/104 |
| 4,476,201 | 10/1984 | Repenning et al. | 429/104 |

Primary Examiner—Donald L. Walton
Attorney, Agent, or Firm—Herbert L. Lerner; Laurence A. Greenberg

[57] ABSTRACT

Electrochemical storage cell of the Na/S type with an anode space and a cathode space separated by a solid electrolyte within which a safety container for sodium is arranged which is in communication with the interior of the solid electrolyte via a hole. A flow resistance having several discharge openings for passage of sodium is arranged in the hole of the safety container.

3 Claims, 1 Drawing Figure

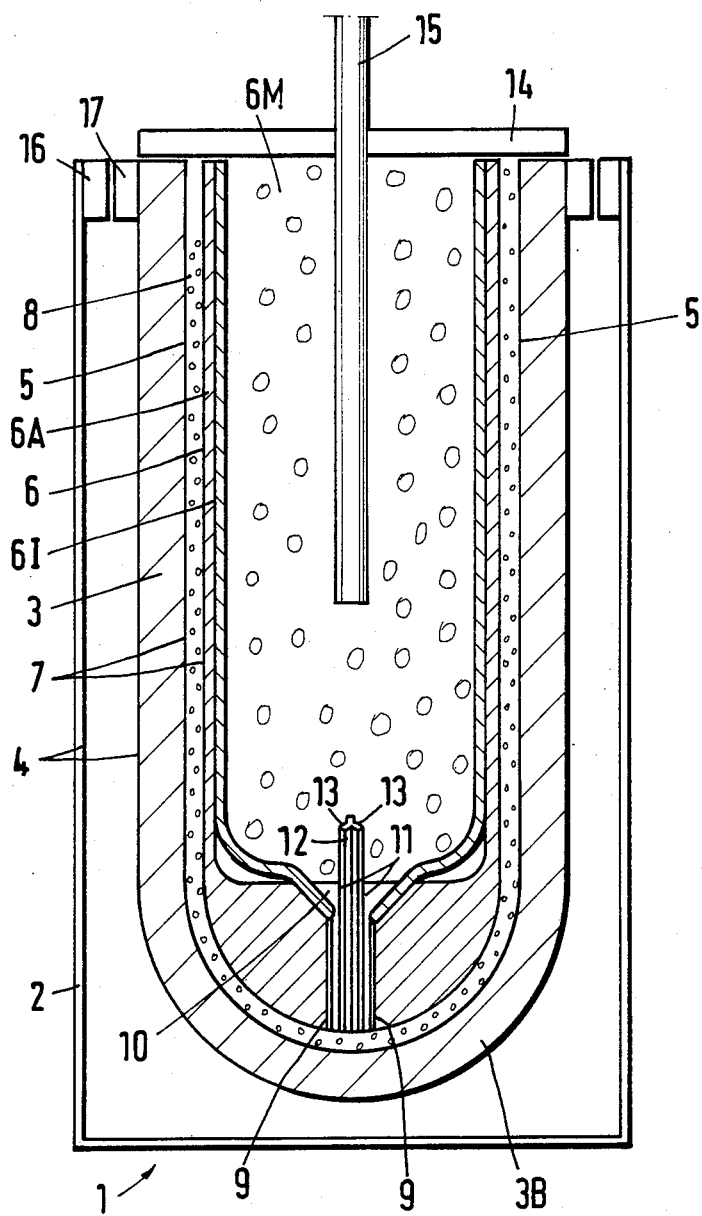

ELECTROCHEMICAL STORAGE CELL

BACKGROUND OF THE INVENTION

1. Field of the Invention

The invention relates to an electrochemical storage cell of the sodium and sulfur type with an anode space and a cathode space which are separated from each other via a cup-shaped solid electrolyte within which a safety container for receiving the sodium is arranged which is in communication with the interior of the solid electrolyte via a hole.

2. Description of the Prior Art

Such electrochemical storage cells are highly suited as energy sources. They find increasing use in the construction of storage batteries which are provided as the power supply of electric vehicles.

A specific example for these storage cells are those of the sodium and sulfur type which are rechargeable and have a solid electrolyte of beta-aluminum oxide which separates the anode space from the cathode space. It is an advantage of these storage cells that no secondary electrochemical reactions occur during charging. The reason for this is that only sodium ions can pass through the solid electrolyte. The current yield of such sodium/sulfur storage cells is therefore approximately 100%. In these electrochemical storage cells the ratio of energy content to the total weight of a storage cell is very large as compared with lead storage batteries, since the reactants are light and much energy is released in the electrochemical reactions.

U.S. Pat. No. 4,247,605 discloses an electrochemical storage cell of the sodium and sulfur type in which a safety container is arranged in the cup-shaped solid electrolyte. The safety container serves to receive the sodium. The dimensions of the safety container and the solid electrolyte are chosen to leave a coherent space between its outside surface and the inside surface of the solid electrolyte. This coherent space which extends all around serves as a safety gap and is filled with a material acting as capillaries. On the side facing the bottom of the solid electrolyte, the safety container is provided with a hole through which the sodium can pass into the solid electrolyte and in particular, into the safety gap. The capillary material contained in the safety gap is powder- or fiber-like. Since this material is arranged in the entire safety gap, especially in the region in which the hole of the safety container is located, this hole may, in the course of time, become clogged up by this capillary material. When clogging of the hole occurs, the outflow and possibly also a return of the sodium from and into the safety container is prevented, with operability of the storage cell limited severely or stopped altogether.

SUMMARY OF THE INVENTION

It is, therefore, an object of the invention to provide a rechargeable electrochemical storage cell in which a continuous flow of sodium from the safety container is made possible and the amount of sodium from the safety container can be limited to a defined value.

With the foregoing and other objects in view, there is provided in accordance with the invention an electrochemical storage cell based on sodium and sulfur comprising an anode space and a cathode space which are separated from each other by a cup-shaped solid electrolyte, a safety container for sodium arranged within the solid electrolyte, a hole in the safety container which is in communication with the interior of the solid electrolyte and a flow resistance which is provided with several discharge openings for the passage therethrough of sodium is arranged in the hole of the safety container.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates an electrochemical storage cell in accordance with the invention shown in vertical section in which a safety container for sodium is arranged in the interior of the solid electrolyte and separated therefrom by a safety gap filled with capillary material. A flow resistance with at least three discharge openings, disposed in a hole in the safety container, permits controlled amounts of sodium to flow into the safety gap while preventing clogging of the discharge openings by capillary material.

DESCRIPTION OF THE PREFERRED EMBODIMENTS

Electrochemical storage cells of the sodium and sulfur type are generally equipped with a safety container which serves for receiving the sodium. The safety container is provided with a hole through which the sodium in the safety container can flow into the safety gap arranged between the safety container and the solid electrolyte. In order to prevent this hole from becoming clogged by the capillary material contained in the safety gap, a flow resistance in form of a screw is arranged in the hole. The screw is provided with a hole extending in its longitudinal axis. Inside the hole a notched pin or a sintered pin is arranged. The notched pin is provided on its outside surface with several notches spaced from each other and arranged parallel to its longitudinal axis. The parallel notches form discharge openings for the sodium.

By arranging a flow resistance in the opening of the safety container, the amount of escaping sodium can be limited to a defined quantity. Preferably, the flow resistance is designed to permit an outflow of sodium which will assure at least a 20- to 40-minute discharge of the electrochemical storage cell. This is achieved by equipping the flow resistance with a defined number of discharge openings. Preferably, the flow resistance has at least three discharge openings. The diameters of these discharge openings are chosen to be smaller than the dimensions of the capillary material which is arranged within the safety gap, thereby making clogging of the discharge openings difficult and unlikely to occur. If a discharge opening should nevertheless become clogged by this capillary material, the amount of discharged sodium through the unclogged openings, even though the flow resistance is increased, is still large enough to assure discharge of the storage cell.

According to the invention, the flow resistance is formed by a screw, the longitudinal axis of which is provided with a through hole, and which screw is screwed into the hole of the safety container. A notched pin or a sintered pin can be inserted into the hole in the longitudinal axis of the screw. If a notched pin is used, it is provided with an appropriate number of notches extending parallel to its longitudinal axis in its outer region in order to obtain three or more openings. These notches form the discharge openings for the sodium passing from the safety container into the safety gap. Instead of a notched pin, a sintered pin can also be inserted into the hole of the screw. Preferably, a pin of nickel or another sodium-resistant material is used. Sintered pins have the advantage over notched pins in that they constitute a system with many parallel pores, and therefore the flow resistance is changed relatively little if one pore becomes clogged. The pores within the sintered pin form several channels through which the sodium can get from the safety container into the safety gap.

The invention will be explained in the following with the aid of the drawing.

The sole FIGURE shows an electrochemical storage cell in a vertical section. The storage cell 1 shown here is bounded to the outside by a metallic housing 2 which is cup-shaped. A solid electrolyte 3, likewise cup-shaped, is arranged in the interior of the housing 2. The dimensions of the solid electrolyte 3 are chosen so that a coherent space 4 remains between the electrolyte and the inside surface of the housing 2 all around. In the embodiment example shown here, this coherent space serves as the cathode space. The interior of the solid electrolyte 3 serves as the anode space 5. A safety container 6 which has double walls is arranged inside of the anode space 5. The outer boundary wall 6A of the safety container is made of aluminum while the inner boundary wall 6I is made of steel. The shape of the safety container 6 is matched to that of the solid electrolyte 3. The dimensions of the safety container 6 are chosen so that a coherent gap 7 remains between outside surface of outer boundary wall 6A and the inside surface of the solid electrolyte 3. Coherent gap 7 is filled with a capillary material 8. The purpose of this capillary material 8 is to distribute the sodium leaving the safety container 6 along the entire inside surface of the solid electrolyte 6 to cause the latter to be wetted always and everywhere by sodium. Opposite the bottom 3B of the solid electrolyte, the safety container 6 is provided with a through hole 9, within which a flow resistance 10 is arranged. In the embodiment example shown here, the flow resistance is formed by a screw which is screwed into the hole 9. The screw has a hole 11 which extends in the longitudinal axis of the screw 10. The hole 11 connects the interior of the safety container 6 to the safety gap 7. In the embodiment example shown here, a notched pin 12 is inserted into the hole 11. The former is provided in its outer region with three notches 13 which form three output openings between the notched pin 12 and the inner boundary surface of the screw 10, through which the sodium arranged in the safety container 6 can flow into the safety gap 7. In addition to sodium inside the safety container 6, there is arranged metal wool 6M which firmly surrounds the current collector 15 and thereby generates an electrically highly conducting connection. The current collector may be a corrosion-resistant metal or graphite rod 15 with one end extending far into the interior of the safety container 6. The second end of the current collector 15 is brought through a closure plate 14 which shuts the interior of the solid electrolyte 3 against the outside. The current collector 15 projects several millimeters to the outside beyond the storage cell 1. The safety container 6 and the safety gap 7 together form the anode space 5. The notched pin 12 arranged in the hole 9 of the safety container 6 divides the hole 9 into several discharge openings 13, and as a result, clogging of the openings by the capillary material arranged in the safety gap 7 becomes almost impossible. The quantity of the sodium leaving the safety container 6 is limited by the notched pin 12 to a defined quantity. This quantity should always be just large enough that the inner boundary surface of the solid electrolyte 3 is completely wetted by the sodium. In the embodiment example shown here, the hole 11 is about 5mm long and has a diameter of 1.5 mm. The notched pin 12 is equipped with three notches 13, the side of which is designed for the escape from the safety container of about 2.5±0.25 g Na/h. About 50 g sodium are disposed within the safety container 6.

The amount of sodium thereby flowing out of the safety container corresponds to the amount which is required for a 30-minute discharge of the electrochemical discharge cell.

According to the invention, a sintered pin 12 made of nickel can also be used instead of the notched pin 12 shown here. The sintered pin 12 has many pores parallel to its longitudinal axis, which pores form discharge canals for the sodium contained in the safety container 6. The danger of clogging these canals is substantially smaller than with discharge openings which are formed by the notches 13 of the notched pin 12.

The storage cell is closed off from the outside, in part, by the plate 14 which closes off the interior of the solid electrolyte 3. The cathode space 4 is closed off by a pressure ring 16 which is fastened to the outside surface of the solid electrolyte 3 via a glass solder 17. This pressure ring 16 is welded to the inside surface of the metallic housing 2, thus closing off the cathode space 4 from the outside completely and permanently.

The foregoing is a description corresponding, in substance, to German application No. P 34 44 917.5, dated Dec. 8, 1984, international priority of which is being claimed for the instant application and which is hereby made part of this application. Any material discrepancies between the foregoing specification and the specification of the aforementioned corresponding German application are to be resolved in favor of the latter.

There is claimed:

1. Electrochemical storage cell based on sodium and sulfur comprising an anode space and a cathode space which are separated from each other by a cup-shaped solid electrolyte, a safety container for sodium arranged within the solid electrolyte, a hole in the safety container which is in communication with the interior of the solid electrolyte and provided with a flow resistance formed by a screw with an external thread, which screw is screwed into the hole of the safety container, said screw having a through hole which extends in its longitudinal axis and into which through hole a notched pin is inserted having in its outside surface at least three notches which are spaced from each other and extend parallel to the longitudinal axis of the notched pin.

2. Electrochemical storage cell based on sodium and sulfur comprising an anode space and a cathode space which are separated from each other by a cup-shaped solid electrolyte, a safety container for sodium arranged within the solid electrolyte, a hole in the safety container which is in communication with the interior of the solid electrolyte and provided with a flow resistance formed by a screw with an external thread screwed into the hole of the safety container, said screw having a through hole which extends in its longitudinal axis and into which through hole a sintered pin is inserted which pin is made of an open-pore corrosion-resistant material with the pores interconnecting to form a plurality of canals through which sodium may flow generally parallel to its longitudinal axis.

3. Electrochemical storage cell according to claim 2, wherein the sintered pin is made of nickel.

* * * * *